(12) United States Patent
Style

(10) Patent No.: US 9,760,549 B2
(45) Date of Patent: Sep. 12, 2017

(54) SYSTEMS AND/OR METHODS FOR PERFORMING ATOMIC UPDATES ON LARGE XML INFORMATION SETS

(71) Applicant: Software AG USA, Inc., Reston, VA (US)

(72) Inventor: Bernard J. Style, Centreville, VA (US)

(73) Assignee: SOFTWARE AG USA, INC., Reston, VA (US)

( * ) Notice: Subject to any disclaimer, the term of this patent is extended or adjusted under 35 U.S.C. 154(b) by 335 days.

(21) Appl. No.: 14/108,762

(22) Filed: Dec. 17, 2013

(65) Prior Publication Data

US 2014/0108917 A1 Apr. 17, 2014

Related U.S. Application Data

(63) Continuation-in-part of application No. 13/551,891, filed on Jul. 18, 2012.

(51) Int. Cl.
G06F 17/22 (2006.01)
G06F 17/30 (2006.01)

(52) U.S. Cl.
CPC .... G06F 17/2247 (2013.01); G06F 17/30492 (2013.01); G06F 17/30917 (2013.01)

(58) Field of Classification Search
CPC ... G06F 17/22; G06F 17/2247; G06F 17/2252

(Continued)

(56) References Cited

U.S. PATENT DOCUMENTS 5,689,711 A * 11/1997 Bardasz ............... G06F 8/34
345/420
5,963,975 A * 10/1999 Boyle ............... G06F 12/0817
711/117

(Continued)

OTHER PUBLICATIONS

Moravan et al.; Supporting Nested Transaction Memory in LogTM; Oct. 21-25, 2006; Architectural Support for Programming Languages and Operating Systems 06; Association for Computing Machinery; pp. 359-370.*

(Continued)

*Primary Examiner* — Andrew Dyer
(74) *Attorney, Agent, or Firm* — Nixon & Vanderhye PC

(57) ABSTRACT

Certain example embodiments described herein relate to techniques for processing XML documents of potentially very large sizes. For instance, certain example embodiments parse a potentially large XML document, store the parsed data and some associated metadata in multiple independent blocks or partitions, and instantiate only the particular object model object requested by a program. By including logical references rather than physical memory addresses in such pre-parsed partitions, certain example embodiments make it possible to move the partitions through a caching storage hierarchy without necessarily having to adjust or encode memory references, thereby advantageously enabling dynamic usage of the created partitions and making it possible to cache an arbitrarily large document while consuming a limited amount of program memory. Such techniques may be extended to enable atomic updates to be processed efficiently, e.g., by maintaining commit level information in a partition list and optionally implementing document shadowing.

22 Claims, 8 Drawing Sheets

(58) Field of Classification Search
USPC .................................................. 715/234, 242
See application file for complete search history.

(56) References Cited

U.S. PATENT DOCUMENTS

| | | | |
|---|---|---|---|
| 6,219,666 B1* | 4/2001 | Krishnaswamy | G06F 8/443 |
| | | | 707/607 |
| 6,343,339 B1* | 1/2002 | Daynes | G06F 9/52 |
| | | | 710/108 |
| 6,542,911 B2 | 4/2003 | Chakraborty et al. | |
| 6,654,855 B1 | 11/2003 | Bopardikar et al. | |
| 6,856,993 B1* | 2/2005 | Verma | G06F 17/30227 |
| 7,092,967 B1 | 8/2006 | Pannala et al. | |
| 7,191,186 B1 | 3/2007 | Pullen | |
| 7,210,097 B1 | 4/2007 | Clarke et al. | |
| 7,366,732 B2 | 4/2008 | Creeth | |
| 7,373,362 B2* | 5/2008 | Detweiler | G06F 17/30008 |
| 7,454,436 B2 | 11/2008 | Meijer et al. | |
| 7,483,915 B2* | 1/2009 | Thompson | G06F 8/24 |
| 7,600,182 B2* | 10/2009 | Carr | G06F 17/243 |
| | | | 715/222 |
| 7,680,875 B1 | 3/2010 | Shopiro et al. | |
| 7,761,459 B1 | 7/2010 | Zhang et al. | |
| 7,809,888 B1 | 10/2010 | Clark et al. | |
| 8,131,728 B2 | 3/2012 | Kingsbury et al. | |
| 8,397,158 B1 | 3/2013 | Nethi | |
| 8,832,674 B2 | 9/2014 | Harris et al. | |
| 2002/0083078 A1* | 6/2002 | Pardon | G06F 9/466 |
| 2002/0147721 A1* | 10/2002 | Gupta | G06F 17/30961 |
| 2002/0157105 A1 | 10/2002 | Vienneau et al. | |
| 2003/0069902 A1* | 4/2003 | Narang | G06F 17/30551 |
| 2003/0200348 A1* | 10/2003 | Humphries | G06F 8/73 |
| | | | 719/310 |
| 2004/0073758 A1* | 4/2004 | Blumrich | G06F 9/52 |
| | | | 711/151 |
| 2004/0254905 A1* | 12/2004 | Tiku | G06F 17/30899 |
| | | | 706/55 |
| 2005/0044197 A1* | 2/2005 | Lai | G06Q 10/10 |
| | | | 709/223 |
| 2005/0203957 A1 | 9/2005 | Wang et al. | |
| 2006/0048097 A1* | 3/2006 | Doshi | G06F 8/315 |
| | | | 717/120 |
| 2006/0288214 A1* | 12/2006 | Dutta | G06F 21/6227 |
| | | | 713/173 |
| 2007/0005622 A1 | 1/2007 | Fernandes et al. | |
| 2007/0260608 A1* | 11/2007 | Hertzberg | G06F 9/466 |
| 2007/0288840 A1 | 12/2007 | Girle et al. | |
| 2009/0031310 A1* | 1/2009 | Lev | G06F 11/1405 |
| | | | 718/101 |
| 2009/0089658 A1 | 4/2009 | Chiu et al. | |
| 2009/0276431 A1* | 11/2009 | Lind | G06F 9/466 |
| 2011/0167416 A1* | 7/2011 | Sager | G06F 8/4442 |
| | | | 717/149 |
| 2011/0264861 A1* | 10/2011 | Fee | G06F 9/5027 |
| | | | 711/122 |
| 2012/0222005 A1 | 8/2012 | Harris et al. | |
| 2013/0139146 A1 | 5/2013 | Bickle | |
| 2013/0198605 A1* | 8/2013 | Nicola | G06F 17/2247 |
| | | | 715/234 |
| 2014/0026027 A1 | 1/2014 | Style | |
| 2014/0101538 A1 | 4/2014 | Style | |

OTHER PUBLICATIONS

Berenson et al.; A Critique of ANSI SQL Isolation Levels; 1995; Special Interest Group on Management of Data 95; Association for Computing Machinery; pp. 1-10.*

Collard et al.; Factoring Differences for Iterative Change Management; 2006; Proceedings of the Sixth IEEE International Workshop on Source Code Analysis and Manipulation (SCAM'06); Institute of Electrical and Electronics Engineers; pp. 1-10.*

"Bind;" Microsoft Computer Dictionary; May 1, 2002; Fifth Edition; p. 73.*

Mike; Operating Systems Development—Physical Memory; 2008; BrokenThorn Entertainment; pp. 1-12.*

Atomic; Apr. 3, 2000; Free On-Line Dictionary of Computing; pp. 1-2.*

XML Parser; Jul. 22, 2010; W3CSchools.com; pp. 1-2.

Instantiation; Jun. 20, 2010; Free On-line Dictionary of Computing; p. 1.

Steve Muench, "Building Oracle XML Applications," Oct. 2, 2000, pp. 1-883.

Wikipedia—Offset (Computer Science), retrieved Apr. 13, 2015, 1 page. http://en.wikipedia.org/wiki/Offset_(computer_science).

XimpleWare, VTD-XML Introduction and API Overview, Feb. 2008, pp. 1-44. http://www.ximpleware.com/vtd-xml_intro.pdf.

Shah et al., "A Data Parallel Algorithm for XML DOM Parsing", Proceedings of Database and XML Technologies, 6th International XML Database Symposium, 2009, Lyon, France, Aug. 24, 2009, pp. 75-90. http://www.cs.arizona.edu/~bkmoon/papers/xsym09.pdf.

The Apache Xerces Project, retrieved Jul. 18, 2012, 4 pages. http://xerces.apache.org/.

"Partition"—Microsoft Computer Dictionary, May 1, 2002, Microsoft Press, 5th Edition, p. 494.

"Cache;" Jun. 7, 2012; Techterms.com; pp. 1-2.

"Encode;" American Heritage Dictionary; 2002; Houghton Mifflin Company; 4th Edition; p. 461.

Data Structures and Other Objects Using C++; Addison Wesley Longman; 1997; p. 179.

"Namespace;" Free On-line Dictionary of Computing; Dec. 9, 2008; pp. 1-2.

Wikepedia—Metadata, http://en.wikipedia.org/w/index.php?title=Metadata&oldid, retrieved Aug. 16, 2016, 12 pages.

Wikepedia—Persistence (Computer Science), https://en.wikipedia.org/w/index.php?title=Persistence_(computer_science), retrieved Jun. 22, 2015, 4 pages.

Wikepedia—Paging, https://en.wikipedia.org/w/index.php?title=Paging&oldid, retrieved Jun. 22, 2015, 11 pages.

Wikepedia—Computer Data Storage, https://en.wikipedia.org/w/index.php?title=Computer_data_storage, retrieved Jun. 22, 2015, 11 pages.

Wikepedia—Don't Repeat Yourself, https://en.wikipedia.org/w/index.php?title=Don't_repeat_yourself, retrieved Jun. 25, 2015, 2 pages.

Wikepedia—Garbage Collection (Computer Science) https://en.wikipedia.org/w/index.php?title=Garbage_collection_(computer_science), retrieved Jun. 22, 2015, 14 pages.

Wikepedia—Write Amplification, https://en.wikipedia.org/w/index.php?title=Write_amplification, retrieved Jun. 22, 2015, 11 pages.

Oracle Text Search "faulty brakes", retrieved Oct. 4, 2016, 22 pages.

Oracle Data Types, Oracle Call Interface Programmer's Guide, Chapter 3, retrieved Oct. 4, 2016, 3 pages.

* cited by examiner

SYSTEMS AND/OR METHODS FOR PERFORMING ATOMIC UPDATES ON LARGE XML INFORMATION SETS

CROSS-REFERENCE TO RELATED APPLICATION

This application is a continuation-in-part (CIP) of U.S. application Ser. No. 13/551,891, filed on Jul. 18, 2012, the entire contents of which are hereby incorporated by reference herein.

TECHNICAL FIELD

Certain example embodiments described herein relate to techniques for processing XML documents of varying sizes. More particularly, certain example embodiments relate to techniques that parse a potentially large XML document, store the parsed data and some associated metadata in multiple independent blocks or partitions, and instantiate only the particular object model object requested by a program. Furthermore, certain example embodiments make it possible to perform atomic updates on large XML information sets.

BACKGROUND AND SUMMARY OF EXAMPLE EMBODIMENTS OF THE INVENTION

XML is a known document encoding standard that facilitates the exchange of information between computer systems. Among other things, XML prescribes a standard way of encoding named hierarchical information.

XML documents can be processed in many ways. However, one common processing technique involves extracting XML documents' information content and creating a memory-resident representation of that information. One commonly used model is the DOM or the Document Object Model, which is governed by a W3C® standard. Each component in an XML document is represented by a discrete DOM object.

One drawback of typical DOM implementations is that the entire object model must reside in memory. Although this approach works well for smaller XML documents (e.g., that can be loaded in memory or a reasonably sized virtual memory), handling very large documents in this way can become cumbersome. For instance, loading large documents may result in high virtual memory demand and poor system performance. This approach also effectively places an upper limit on the size of any XML document that can be processed that depends, for example, on the amount of available memory (real and/or virtual). Additionally, for environments that use dynamic allocation (such as, for example, Java-based environments), this situation results in large numbers of discrete heap-resident objects, which can potentially adversely affect the performance of memory recovery for the objects when they are no longer in use (e.g., through garbage collection). Those skilled in the art know that system performance often degrades sharply when document size becomes unmanageable.

Yet another drawback of the memory-resident approach is that it can be very difficult to share a parsed document in a federated system where processes may not have convenient access to shared memory.

Of course, it would be desirable to implement an approach to XML parsing that performs consistently well under varying circumstances such as, for example, simultaneously processing a small number of very large documents, simultaneously processing a large number of small documents, and/or the like. The need to meet these desires becomes yet more important as the system scales up to an Enterprise-class server sized system.

The inventor has observed that solutions to the XML memory problem tend to fall into one of three categories, namely, adapting the application to an existing DOM model in some pragmatic way, using some model other than DOM, or implementing an improved DOM implementation that improves on prior implementations.

Pragmatic adaptation to DOM oftentimes includes allocating large amounts of memory to the process and simply tolerating poor performance; designing or redesigning the application to limit the size of the document; and/or resorting to some type of ad-hoc partitioning of the documents. Some products currently available by the assignee of the instant application employ the ad-hoc partitioning approach for processing very large documents. For example, the assignee's Integration Server provides an iterating parser that generally makes it possible to maintain a parsing window that typically avoids loading the entire document, subject to certain constraints of course. As another example, the assignee's Trading Networks decomposes large documents into smaller documents in a very specialized approach. It is noted that adapting an application to use ad-hoc partitioning can be very difficult, depending on the size, complexity, processing requirements, and other features of the application and/or environment. Similarly, obtaining maximum performance using ad-hoc partitioning also can be difficult.

Using models other than DOM typically involves a streaming approach in which information is processed during one pass of the document. A streaming push model, such as SAX, can be very efficient from a performance point of view. Unfortunately, however, such models oftentimes are difficult to program. A streaming pull model, such as the AXIOM (TRADEMARK) model used by Axis, is easier to use in many situations, but still does not lend itself well to situations that require non-document-order processing. If it is not possible to process data in document-order, the user generally must enable AXIOM (TRADEMARK) Axiom caching, which stores processed data in a cache so that it may be subsequently reused. This cache, however, is a memory-resident pool of objects and, as a result, its behavior can still degrade into the DOM-like pattern, depending on the usage pattern. The current Integration Server product requires that the entire model be memory resident in order to convert the XML document into an Integration Server Document, so the streaming approach does not improve native Document processing as greatly as is desirable.

Another non-DOM implementation is Ximpleware's VTD-XML. See, for example, U.S. Pat. No. 7,761,459, the entire contents of which are hereby incorporated herein by reference. This implementation is believed to completely avoid the creation of DOM objects. It instead uses a location cache (e.g., a Binary File Mask or BFM) to maintain information about the document that resides somewhere else in memory or on disk. The VTP API apparently allows a program to access the document contents from a combination of information in the BFM and the original document without requiring object instantiation. Ximpleware claims that this approach significantly improves performance. Yet there are drawbacks associated with this approach. For example, many third-party products are designed to work with the DOM API. Without the DOM API, this approach is a programming island, requiring custom programming for each application. Moreover, although the '459 patent provides for updates (e.g., adding new components) by allocating empty records in the Binary File Mask, there is no description is provided for the circumstances under which the empty records become filled, or how performance might be affected by a large number of insertions into the original document.

Other non-DOM approaches include customized applications that do not directly utilize DOM. For example, U.S. Pat. No. 8,131,728 (apparently assigned to IBM®), which is hereby incorporated herein by reference in its entirety, describes a technique for extracting the structural information from an XML document and encoding the structural information as a memory-resident index with indexes into the original source data document. The application, a high-speed utility for loading and unloading a Configuration Management Database, processes the smaller memory-resident index rather than the larger source document. Unfortunately, however, the '728 patent (e.g., at col. 5, lines 7-23) suggests that the index is memory-resident, which effectively limits the ultimate size of the document that can be processed, and/or the number of documents that can be processed concurrently due to the total memory occupied by the index.

Other attempts have been made in the pursuit of an improved DOM implementation. The Apache foundation's Xerces (TRADEMARK) DOM parser, for example, is widely used throughout the industry. This product makes use of deferred object instantiation, but unfortunately does not provide a caching mechanism to facilitate processing of documents whose memory model exceeds the amount of available memory.

It is believed that neither Xerces (TRADEMARK) nor AXIOM (TRADEMARK) provides the ability to process arbitrarily large documents in a random fashion. And while Ximpleware VDT-XML can process arbitrarily large documents, it does so using a non-standard (e.g., non-DOM) API.

None of these approaches explicitly describe a systematic technique for limiting the total memory allocation for the Document processing within a system. More generally, there do not seem to be any apparent facilities for systematic tuning of system performance.

In addition to the above-identified issues with the conventional approaches discussed above, it is believed that none of these approaches addresses the issue of sharing a large parsed document if a session migrates across processor sessions. Furthermore, it is believed that none of these approaches addresses the issues of scalability and predictability for Enterprise-class and/or other large scale servers. There is no express explanation in the above-identified approaches tending to show that shared and/or distributed processing can be accommodated.

In brief, the processing of very large XML documents using the standard DOM can be costly in both memory and processor consumption. Yet, users continue to employ DOM because it provides a standardized approach that works with a large number of tools, and because it also provides a convenient programming API for users who have needs that can be met by standardized tools.

Thus, it will be appreciated by those skilled in the art that there is need for improved techniques for processing large XML documents, e.g., in ways that overcome the above-described and/or other problems.

In certain example embodiments, a system for processing XML documents is provided. Processing resources include at least one processor, a memory, and a non-transitory computer readable storage medium. The processing resources are configured to: parse an XML document into one or more constituent nodes, with the XML document including a plurality of objects representable in accordance with an object model, and with the XML document being parsed without also instantiating the objects therein; store the parsed constituent nodes and associated metadata in one or more partitions; and in response to requests for objects from the XML document from a user program, instantiate only said requested objects from their associated partition(s) in accordance with the object model.

In certain example embodiments, a method of processing large documents is provided. In connection with at least one processor, a large document is parsed into one or more constituent nodes, with the document including a plurality of objects representable in accordance with an object model, and with the document being parsed without also instantiating the objects therein. The parsed constituent nodes and associated metadata are stored in one or more cacheable partitions, with the cacheable partitions being located in a memory and/or a non-transitory backing store. A request from a user program for an object from the document is handled by: identifying the partition(s) in which nodes corresponding to the requested object is/are located, and instantiating only said requested objects from the identified partition(s) in accordance with the object model. The cacheable partitions are structured to include only logical references among and between different nodes.

In certain example embodiments, there is provided a non-transitory computer readable storage medium tangibly storing instructions that, when executed by at least one processor of a system, perform a method as described herein.

According to certain example embodiments, each said cacheable partition may include a locator array, a properties array, and a character array. The locator array may be configured to identify starting positions of nodes encoded in the properties array. The properties array may be configured to store encoded nodes, as well as, for each said encoded node: metadata including a respective node type, reference(s) to any familial nodes thereof, and offset(s) into the character array for any attribute and/or text value(s) associated therewith.

According to certain example embodiments, the XML document may be parsed by executing a pre-parsing initialization process that includes: creating a cacheable document node that corresponds to the starting point for user program access to the XML document; allocating a name dictionary that includes an indexed entry for each unique XML tag name included in the XML document; allocating a namespace dictionary that includes an index entry for each unique XML namespace included in the XML document; and allocating a partition table that includes a list of cacheable partitions and an allocation array that allows a node's allocation identifier to be resolved to a specific cacheable partition, each said cacheable partition including metadata from the pre-parsing initialization process.

According to certain example embodiments, the parsing may include: recognizing parsing events of predefined parsing event types within the XML document; creating nodes for the recognized parsing events; adding the created nodes to a current partition while there is sufficient space therein; and creating a new partition when there is insufficient space in the current partition for adding created nodes, updating the partition table, and continuing with the adding by treating the newly created partition as the current partition.

A feature of certain example embodiments is that the partitions may be movable from the memory to the non-transitory computer readable storage medium when memory usage reaches or exceeds a threshold.

Another feature of certain example embodiments is that the partitions may be movable through a caching storage hierarchy of the processing resources without adjusting or encoding memory references therein.

Another feature of certain example embodiments is that objects instantiated from the partitions, when resident in the memory, may be free from references to other objects in their own respective partitions and any other partitions.

Still another feature of certain example embodiments is that partitions for the parsed document may be removed from the memory and/or the non-transitory computer readable storage medium when the user program no longer includes any references to the document or any objects thereof Still another feature of certain example embodiments is that the partitions may include only logical references among and between different nodes.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
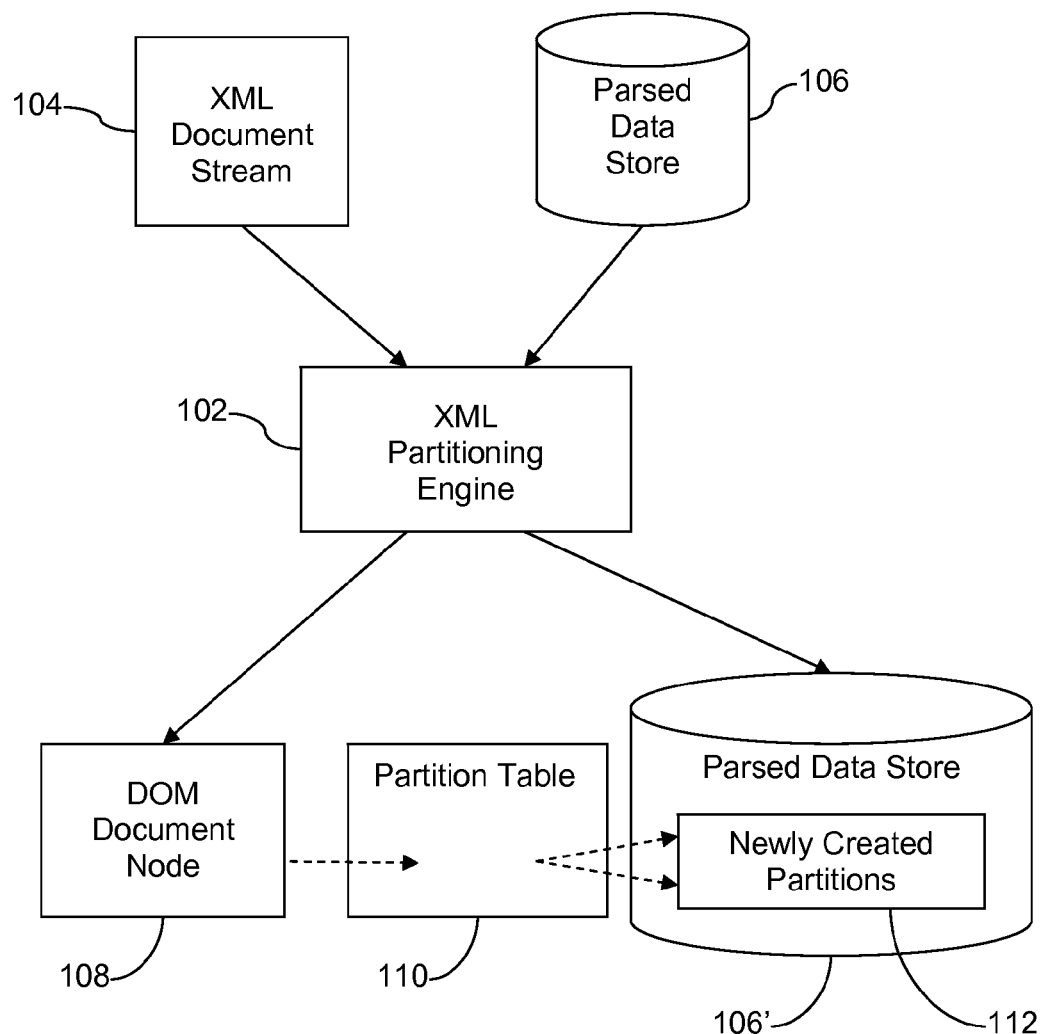
FIG. 1 is a schematic view that demonstrates user program creation of cached XML documents in accordance with certain example embodiments.

Certain example embodiments relate to DOM implementations that improve large XML documents processing. The techniques of certain example embodiments do not create the entire object model. Instead, they may completely parse the XML document, storing the parsed data and some metadata in multiple independent blocks, hereafter referred to as partitions. The techniques of certain example embodiments may, in addition or in the alternative, instantiate (e.g., create) only the particular DOM object requested by a program. Employing these techniques alone and/or in combination advantageously reduces the number of memory-resident structures needed to represent an XML document, thereby making it possible to efficiently process very large documents without consuming large amounts of memory.

It will be appreciated, then, that certain example embodiments involve the pre-parsing of an XML document into independent partitions that include the parsed data for the XML document, without necessarily creating the associated DOM objects. Theses partitions may include logical references rather than physical memory addresses in certain example embodiments, and the partitions can be moved through a caching storage hierarchy without necessarily having to adjust or encode memory references. This design approach advantageously enables dynamic usage of the created partitions. Unlike many conventional approaches, the partitions of certain example embodiments are not necessarily bound to a static memory address, a database temporary table, or even a particular process. This makes it possible to cache an arbitrarily large document while consuming a limited amount of program memory. Additionally, the DOM objects instantiated from any of the partitions, when memory-resident, may lack all references to objects in its own or any other partitions, thereby making each partition independent even when memory-resident. As a consequence, operating environments that use a dynamic heap (such as, for example, Java-based environments) automatically gain the additional benefit of automatic memory reclamation for partitions that are not in use (e.g., referenced). Because it is possible to share a disk-backed cache (such as, for example, Terracotta's BIGMEMORY® cache utilizing the Terracotta Server Array), it becomes possible to access a parsed document from a programming session that migrates between computer systems (e.g., that have a shared disk cache).

Certain example embodiments are advantageous in the sense that the object model becomes naturally updatable. The parsed data allocation scheme of certain example embodiments does not require that logically adjacent content be physically adjacent in a partition. For instance, a newly allocated node (as well as text and/or attribute values) can be physically added the end of the last cacheable partition. References from pre-existing nodes in other partitions to the newly created node may be established using the allocation identifier of the newly encoded node.

The systematic throttling of memory consumption advantageously leads to stable and predictable system operation when processing large documents or large numbers of documents.

Certain example embodiments involve an XML partitioning engine, a parsed data store, and a DOM instantiator. The XML partitioning engine may be implemented as a program that reads an XML document stream and converts it into a series of encoded nodes in cacheable partitions that contain no memory references (e.g., addresses). The parsed data store may be implemented as a program and/or repository that stores and retrieves the cacheable partitions outside of the user program's memory space (for example, in Java, outside of the memory heap). The DOM instantiator may be implemented as a program that creates DOM objects on demand. It may accomplish this by retrieving the appropriate cacheable partition from a local partition pool or the parsed data store, and creating the DOM object. For example, in Java, it may construct an appropriate W3C® DOM node. Further details of these example components will be provided below in connection with an example implementation.

FIG. 1 is a schematic view that demonstrates user program creation of cached XML documents in accordance with certain example embodiments. The user program may initiate document creation by invoking the XML partitioning engine 102, e.g., with the source document XML stream 104 and a parsed data store implementation 106 as inputs. The XML document stream 104 may be thought of as the stream of characters comprising the XML document. The parsed data store 106, on the other hand, may provide the mechanism for storing the encoded document outside of the program's memory space.

The XML partitioning engine 102 may return a standard W3C® DOM document node implementation that includes all of the information needed to construct DOM objects 108 from the parsed document. The user program may employ standard DOM methods to navigate the parsed document. Each navigation request may retrieve associated backing information, e.g., from the parsed data store 106 or the local partition pool, and instantiate (e.g., create) the requested object. As will be explained in greater detail below, a partition table 110 may include a list of cacheable partitions. The newly created partitions 112 may be stored in the now-updated parsed data store 106'.

When the user program no longer includes any references to the document node or any nodes related to it, the backing cacheable partitions for the parsed document may be removed from the parsed data store 106. For example, in Java, the finalizer method may be invoked on the documents when there are no references to the document and, thus, the backing partitions can be removed from the parsed data store 106.

Figure 2:
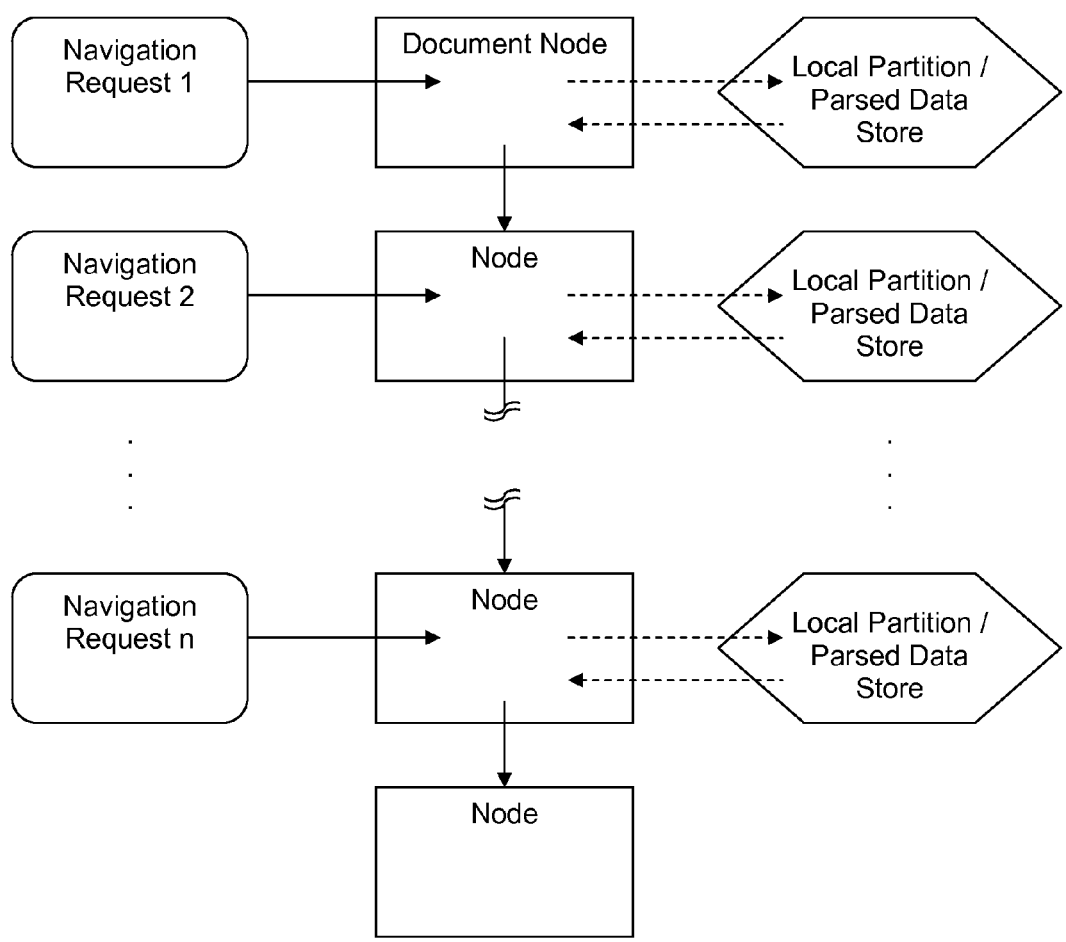
FIG. 2 demonstrates user navigation of a cached document, in accordance with certain example embodiments.

FIG. 2 demonstrates user navigation of a cached document, in accordance with certain example embodiments. As can be seen, navigation requests are processed and used to retrieve nodes from local partition(s) and/or the parsed data store, and from a programmer's point of view, externally, the document does not "look" any different from a typical DOM structure. However, there are differences internally, e.g., in the structure of the document and how the tree structure is managed as set forth in greater detail below. The final node in the chain may be used to convey an "end of program" or "end of processing" message back to the user. In some cases (for example in some garbage-collected runtimes such as Java-based environments), such an explicit "end" message may not necessary, as a garbage collector may simply operate on the structure automatically. For example, in some cases, the Java implementation may receive a call-back, indicating that the buffers in the parsed document store are no longer in use.

Figure 3:
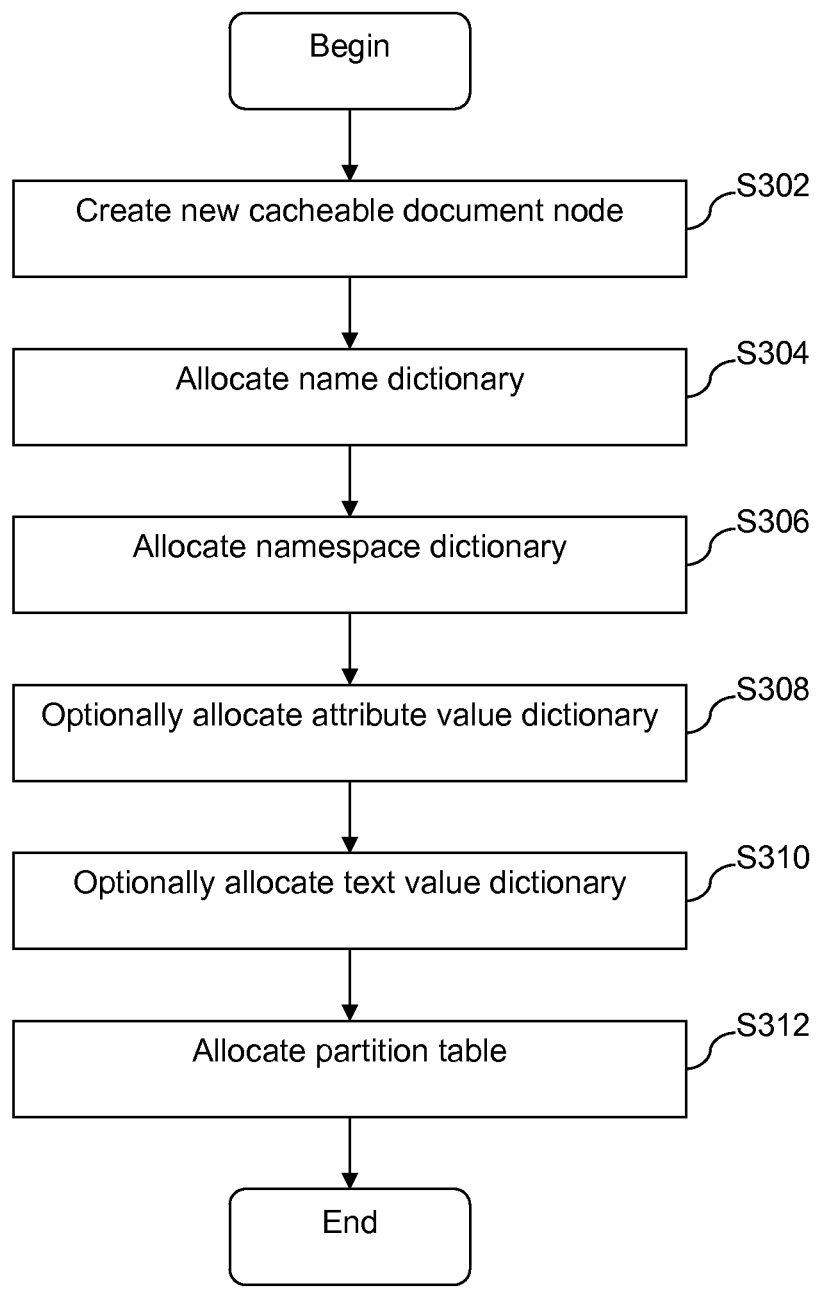
FIG. 3 is a flowchart showing an example initialization process for the partitioning process, in accordance with certain example embodiments.

As indicated above, the XML partitioning engine is configured to receive an XML input stream and/or a parsed data store entry as input. It may, as output, produce encoded XML fragments (that may be stored in the parsed data store) and a DOM cacheable document node (e.g., for program's memory space). FIG. 3 is a flowchart showing an example initialization process for the partitioning process, in accordance with certain example embodiments. A new cacheable document node is created in step S302, which may be, for example, a W3C® Document Node that serves as the starting point for user program access. A name dictionary is allocated in step S304, with the name dictionary including one entry for each unique XML tag name that appears in the document. The dictionary may be structured as a sequential list, and items in the dictionary may be referenced by an integer or other index. This structure can in some instances result in considerable memory savings for large document, e.g., when there are many occurrence of a given tag name, and especially when the names are long. The name dictionary may be empty initially and may be implemented in fashion to expedite the test for uniqueness. For example, a binary search or hash table may be used. A namespace dictionary is allocated in step S306. The Namespace Dictionary may include one entry for each unique XML namespace that appears in the document and, similar to the above, the namespace dictionary may be implemented as a sequential list, with items in the dictionary being referenced by an integer or other index. Initially, the namespace dictionary may be empty. The namespace dictionary may be implemented in fashion to expedite the test for uniqueness, and binary searching or hash tables may be used to facilitate this behavior in certain example embodiments.

Optionally, an attribute value dictionary may be allocated in step S308. When it is used, unique occurrences of attribute values may be saved to this location, potentially reducing memory usage. Its implementation may be similar to the names and namespace dictionaries. In addition, or in the alternative, a text value dictionary optionally may be allocated in step S310. When it is used, unique occurrences of text values may be saved here, potentially reducing memory usage. Its implementation may be similar to the names and namespace dictionaries.

A partition table allocated is in step S312. As alluded to above, the partition table may include a list of cacheable partitions, wherein each cacheable partition includes the information from the pre-parsed XML document. Initially, the partition table is empty. It may include, for example, an allocation array that records the allocation identifier of the last encoded node in a partition. This may make it is possible to determine which cacheable partition includes a given node without retrieving the partition if it has been archived to the parsed data store.

Figure 4:
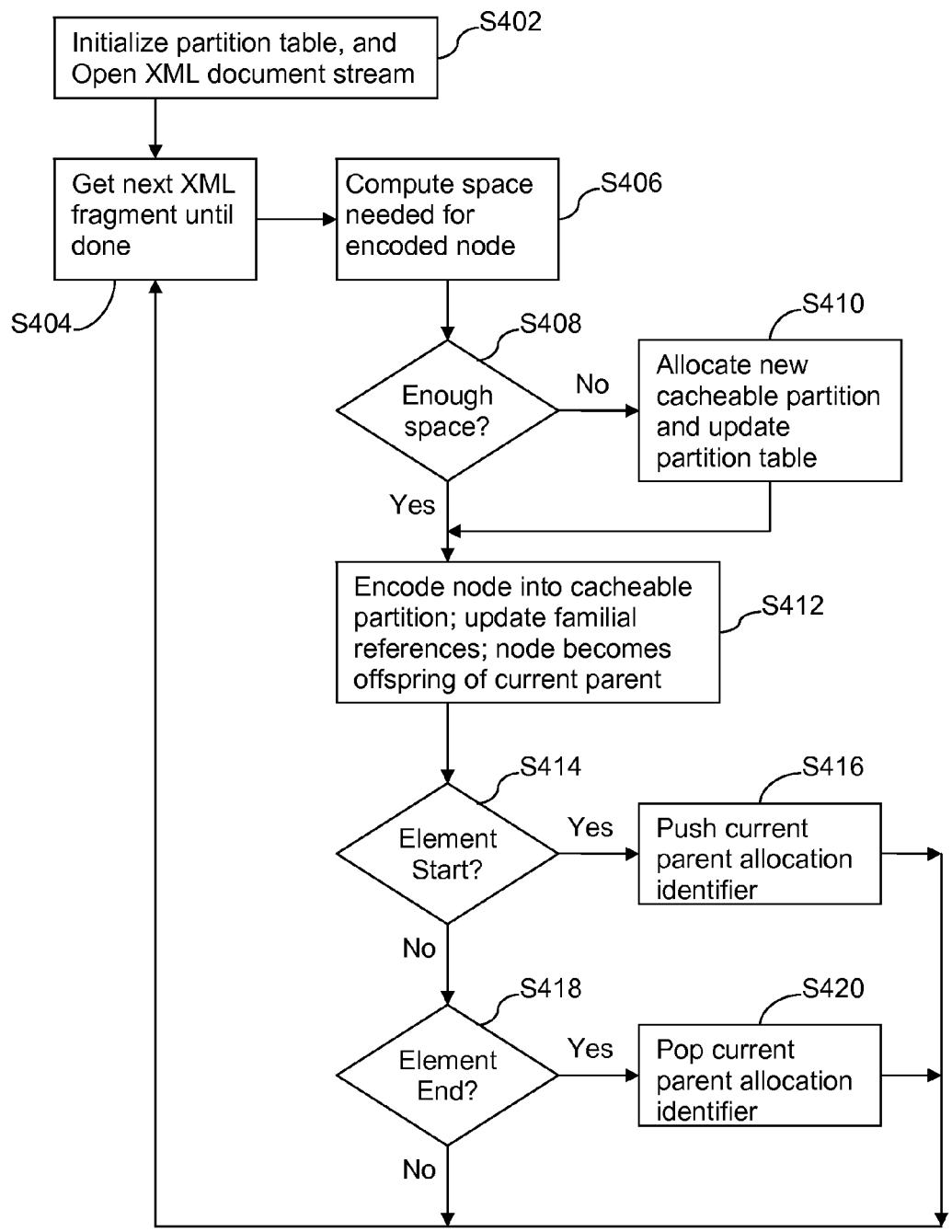
FIG. 4 is a flowchart showing an example partition process in accordance with certain example embodiments.

FIG. 4 is a flowchart showing an example partition process in accordance with certain example embodiments. As shown in step S402, the partition table is initialized (e.g., in accordance with the example process described above in connection with FIG. 3), and the XML document stream is opened. The cacheable document node created in step S302 becomes the current parent node and all subsequently encoded nodes are descendent children of the document node. A streaming XML tokenizer processes an XML document fragment, responding to a sequence of XML parsing events such as the start of an XML element, the declaration of an XML namespace, the presence of an XML attribute, the presence of character data, the presence of a comment, etc. Accordingly, as shown in step S404, the next XML fragment is obtained until processing of the document is complete. As the parsing events are recognized, each event is used to move associated parsed data (if the event has associated data) into a cacheable partition. In step S406, the parsing event determines the amount of space that is needed in the current cacheable partition. If there is insufficient space (e.g., as determined in step S408), a new cacheable partition is allocated and added to the partition table (e.g., in step S410).

If there is enough space in the current cacheable partition, or once a new cacheable partition is created and the partition table is updated accordingly, the node is encoded into the appropriate cacheable partition in step S412. In brief, its familial references may be updated, and the new node may become the offspring of the current parent. When a node is encoded into a partition, its position in the property array may be recorded in the locator array so that it is possible to quickly find the position of an encoded node given its allocation identifier. Each partition may have a structure that supports this functionality. For instance, each partition may include a character array where XML text and XML attribute values are copied, a properties array where the various properties of the XML event are encoded and, a locator array that sequentially records the position in the properties array where a node's properties are stored. The properties of the XML event may include information such as, for example, the type of node, the allocation identifiers of its parent, its sibling and first and last child nodes, references to the character array where the event's textual information is stored, etc.

In certain example embodiments, the parsed data for each event type at step S412 may be written as follows. When an element start tag event is processed, the current position in the properties array is recorded in the location array (e.g., so that the start of the element in the properties array can be identified accordingly), and an element code is written to the properties array, along with an integer or other index into the name dictionary. When an element's namespace declaration is processed, an index is written to the properties array, along with a reference to the appropriate namespace dictionary entry. When an attribute is encountered, an index is written to the properties array, along with a reference to the appropriate name dictionary entry. The attribute value may be copied to the character array, and the location of the attribute value in the character array may be copied into the properties array following the attribute name index. When a text event is received, a text code may be written to the properties buffer. The text content may be copied to the character array, and the position in the character array may be saved in the properties array. When a comment event is received, a comment code may be written to the properties array, followed by an index being written into the character array. The comment content may be copied into the Character Array. After the data for an event has been encoded (e.g., in step S412), additional special processing may occur for the element start and element end events. When an element start is processed (e.g., as indicated in step S416), the allocation identifier for the current parent node is saved (e.g., by pushing it onto a LIFO stack). The allocation identifier of the just encoded element becomes the new current parent node. All subsequently allocated nodes become children of the new current parent node. When an element end tag is processed (e.g., as indicated in step S420), the current parent node is restored to its previous value (e.g., by popping it from a LIFO stack). All subsequently allocated nodes become children of the previous parent node. When no more XML fragments are available at step S404, the document has been completely processed.

In certain example embodiments, an optional throttling mechanism may be used to limit the total amount of program storage that is allocated to the local partition pool. This may in some instances make it possible to dampen the effects of an atypically large number of documents arriving during a short interval, while reducing the likelihood of insufficient memory errors.

As alluded to above, when the current cacheable partition becomes full, a new cacheable partition may be allocated. If the local partition pool also is full, the cacheable partition may be archived to the parsed data store. In order to transfer a Cacheable Document intact to a different session, cacheable partitions in the local partition pool may be archived to the parsed data store. Additionally, the partition table itself, which may not normally be archived, may also be committed to the parsed data store. If the archival storage system supports direct access to archived data (e.g., without full serialization and deserialization), it also may be possible to curtail the use of the local partition pool in favor of direct access to the archived data. Thus, there may be no inherent limit on the number and size of partitions, other than the total available program memory, cache, disk storage, etc.

Figure 5:
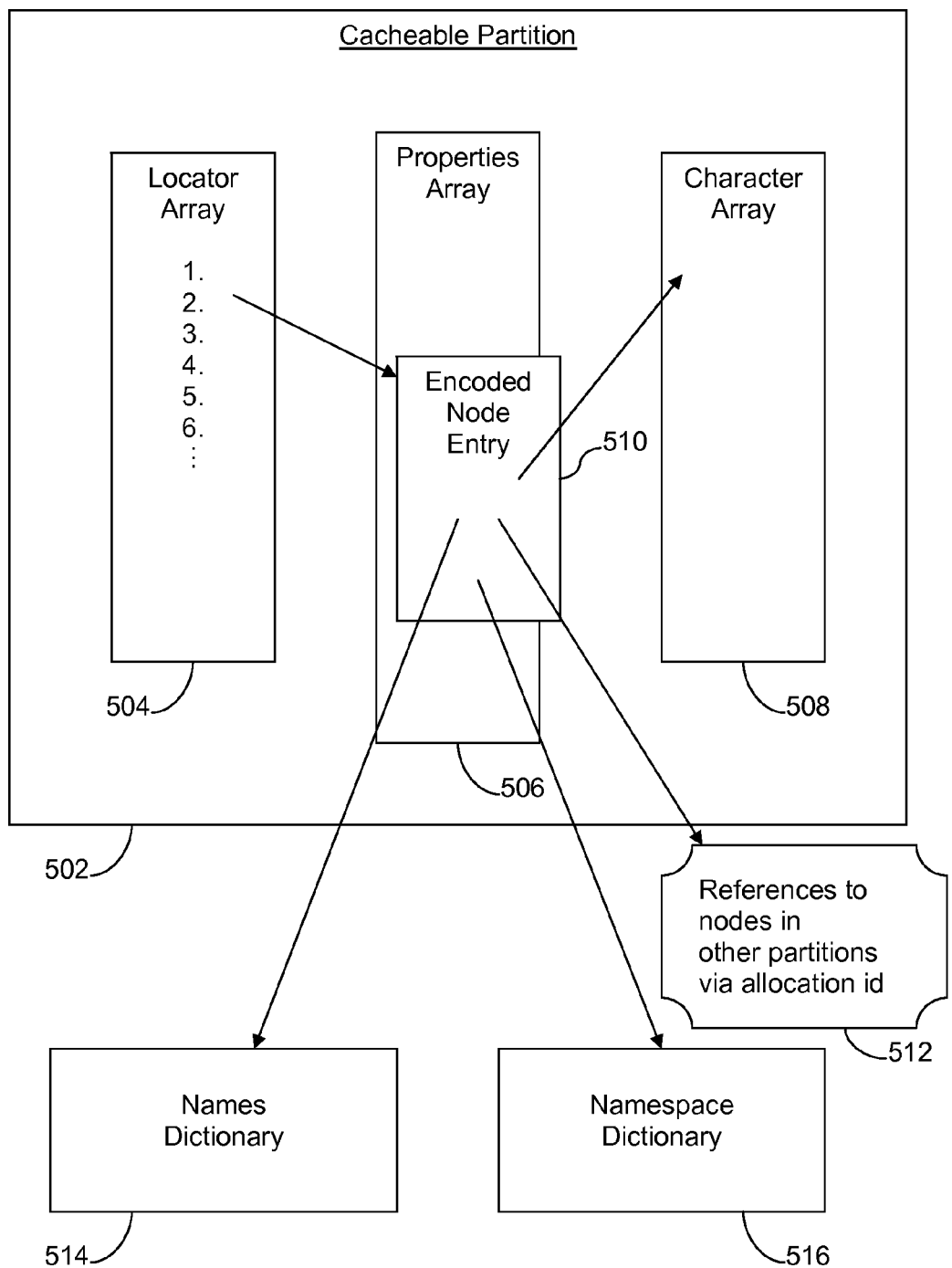
FIG. 5 schematically shows the contents of an example cacheable partition created by a partitioning engine in accordance with certain example embodiments.

FIG. 5 schematically shows the contents of an example cacheable partition created by a partitioning engine in accordance with certain example embodiments and, thus, shows an example encoding for the nodes. The cacheable partition 502 shown in FIG. 5 includes a locator array 504, a properties array 506, and a character array 508. The inclusion of the locator array 504 indicates that certain example embodiments involve locator information being stored in each partition (e.g., as opposed to retaining a single completely memory-resident index). Plural encoded node entries may be present in the properties array 506. The example encoded node entry 510 shown in FIG. 5 may include a variety of data and/or linkages to data. For example, nodes may have an entry for DOM node type. Additionally, there may be references 512 (allocation identifiers) for parent, previous sibling, and next sibling.

Text nodes may have an offset into the character array. If a dictionary is used for text values, then an offset into the text value dictionary may be used instead of an offset into the character array. Comment nodes and processing instruction nodes may have offsets into the character array 508.

Elements may have an offset into the names dictionary 514 and, if the namespace is qualified, they also may have an offset into the namespace dictionary 516. There also may be a list of entries, e.g., with one entry for each attribute. Each entry may include an offset into the names dictionary 514, an offset into the namespace dictionary 516 (if needed), and an offset into the character array 508 of the partition table. If the optional attribute values dictionary is in use, an offset into the attribute values dictionary may be saved instead of an offset into the character array 508. Additionally, elements may have allocation identifier references to their first and last child nodes.

As indicated above, and as can be appreciated from the description of FIG. 5, certain example embodiments do not retain original documents or references to their contents. In certain example embodiments, there is no encoding for an element end because all familial references may be fully realized as allocation identifiers in the encodings rather than being computed based on context. In other words, familial relationships between nodes may be represented using the allocation identifier uniquely assigned to each node.

Instantiated DOM nodes may reference familial nodes (e.g., parent, sibling, and/or child nodes) using the familial node's allocation identifier. Thus, in certain example embodiments, the XML instantiator may find the referenced node in the appropriate cacheable partition by searching the allocation array. After locating the appropriate cacheable partition, the allocation identifier may be used as an offset into the partition's locator array, e.g., to determine the position of the encoded node information in the properties array. The information may be used to construct a DOM node, and the node may be returned to the requesting program.

Because these DOM nodes may not include any address references to other DOM nodes, the nodes may be eligible for deallocation (or garbage collection) when they are no longer in use. By contrast, in a traditional DOM tree, retaining a reference to any node in the tree retains the entire tree.

The parsed data store may be thought of as at least partly being an off-program-memory bag that is used to archive cacheable partitions. The parsed data store does not occupy storage in the user program's space in certain example embodiments and thus makes it possible for a user program to access an arbitrarily large XML document, in some instances constrained only by the amount of storage accessible to the parsed data store.

Figure 6:
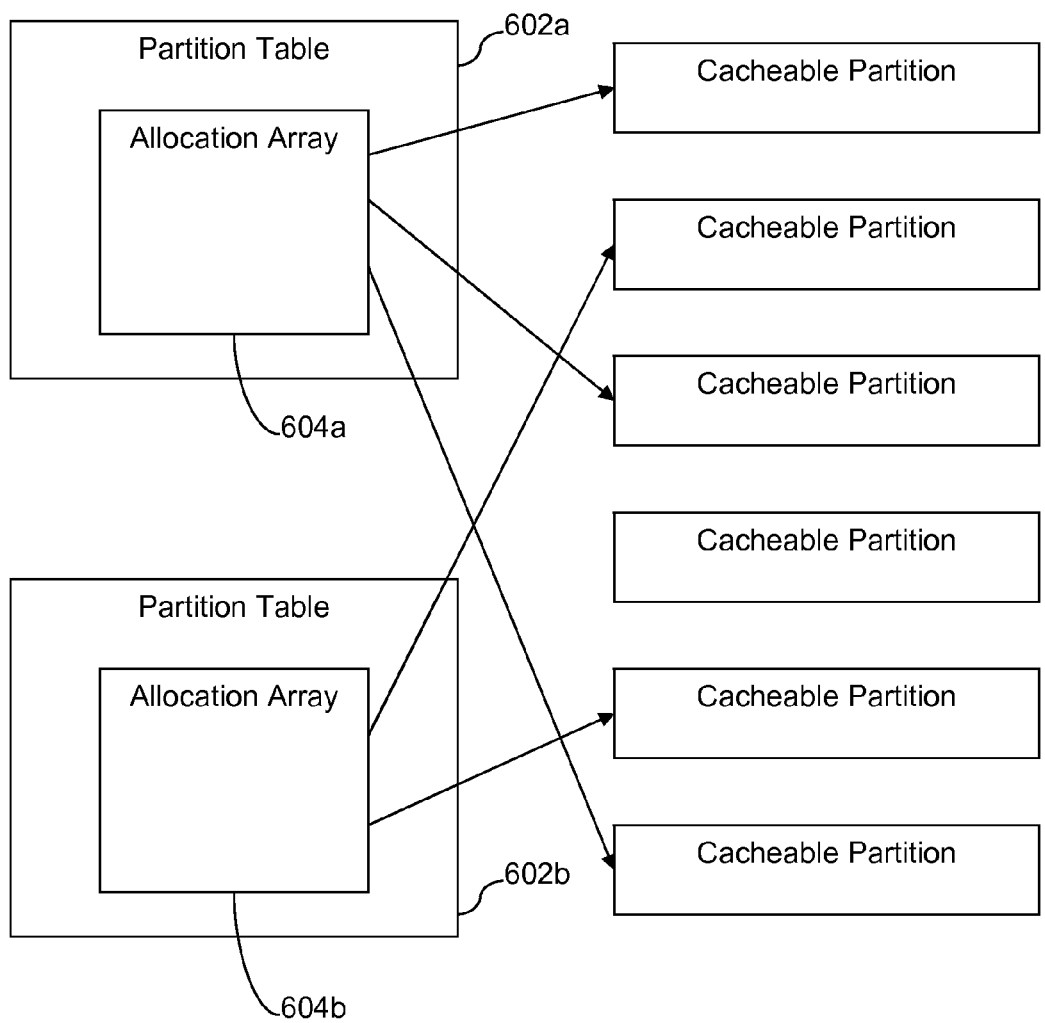
FIG. 6 schematically shows partition tables organizing collections of cacheable partitions for cacheable documents in the parsed data store in accordance with certain example embodiments.

The overall structure of an example parsed data store is shown in FIG. 6. That is, FIG. 6 schematically shows partition tables organizing collections of cacheable partitions for cacheable documents in the parsed data store in accordance with certain example embodiments. In the FIG. 6 example, first and second partition tables 602a-b store respective allocation arrays 604a-b. The allocation arrays 604a-b include references to cacheable partitions, e.g., of the sort described above in connection with FIG. 5. It will be appreciated from the FIG. 6 diagram that partitions from multiple documents can be stored in a single given store, e.g., since there is no connection to one of the cacheable partitions. However, in some example embodiments, it is possible to have a one-to-one relationship as between partition stores and documents.

Certain example embodiments may use Terracotta BIG-MEMORY® caching to store the cacheable partitions in off-heap memory. See, for example, U.S. application Ser. No. 13/354,892, filed on Jan. 20, 2012, for a description of such example techniques. The entire contents of this application are hereby incorporated herein by reference.

When it comes to updating cached documents, certain example embodiments may not include an explicit update mode for cached documents, since cached documents are implicitly updatable via the DOM API. Updating an encoded node simply involves replacing existing references in the encode node with new references. From a user's perspective, instead of being driven by parsing events, the node creation methods in the DOM API may in certain example implementations directly call the node encoding program to append new encodings to the cached partitions. These appended encodings may be physically adjacent to one another, but their logical positions may be anywhere in the document, thereby fully supporting the ability to insert new child nodes and/or remove existing child nodes, at any point in the tree.

In certain example embodiments, by default, text and attribute values may be copied "as is" into each cacheable partition's character array. However, there are situations when there is a great deal of repeated data and, therefore, it may be reasonable to enable these dictionaries in some cases. Thus, as indicated above, text and attribute value dictionaries optionally may be implemented. The added overhead of performing a uniqueness check may be lower than the overhead of copying and caching large amounts of duplicate data, especially when the number of unique alternatives is relatively small.

Certain example embodiments may write partition data directly to the parsed data store bypassing, for example, the local partition pool. This may be advantageous, e.g., if the direct write to the parsed data store is efficient. A Terracotta BIGMEMORY® based implementation of the parsed data store may provide direct partition update functionality in a scalable and efficient manner in certain example embodiments.

In certain example implementations, dedicated partitions may be allocated when the system is initialized, and the parsed data store may retain ownership of the partitions through the system lifecycle. This optional approach (rather than allocating partitions on demand) can help to reduce the likelihood of the heap storage that is intended for use by the parser being scavenged by other non-parsing processes. Such scavenging otherwise may sometimes result in over-utilization of heap storage (e.g., by non-parsing processes) and lead to poor overall system performance.

When local partition throttling is used, the parsed data store may limit the amount (e.g., in terms of total size or number) of storage that is committed to cached partitions throughout the system. When a threshold is exceeded, no new documents may be parsed until total usage by all documents drops below the threshold and/or any attempt to allocate a new cacheable partition causing an existing local partition to be archived to the parsed data store may be at least temporarily halted, e.g., until data is moved to backing storage. Tradeoffs may be considered when tuning a system with a high transaction rate, e.g., so as to reduce the overall system impact. For example, partition size, processing power, I/O time, amount of memory, etc., may be taken into consideration when implementing certain example embodiments.

The various characteristics of the system may be used to tune the behavior of as appropriate for a given installation. Example tuning techniques may include, for example:

Varying the amount of memory allocated for local partitions, which can reduce the impact of peak document arrival at a server (e.g., in terms of number and/or size);

Dedicated memory allocation for the local partitions, which can reduce the likelihood of non-parsing threads over-utilizing heap storage;

Using attribute value dictionaries, which can reduce total memory usage (e.g., local memory and/or cache usage), for instance, when there is a high incidence of repeated attribute values;

Using text value dictionaries, which can reduce total memory usage (both local memory and/or cache usage), for instance, when there is a high incidence of repeated text values; and/or Partition size can be selected. When an environment supports direct access to the cached store, larger buffer sizes may be advantageous. When environments do not support direct access to the cached store, smaller buffer sizes may be advantageous. The use of shared access with an updater may in some instances benefit from smaller partition size.

When the user program no longer contains references to the document node or any of its children nodes, the archived buffers in the parsed data store may be released.

Inter-process sharing of a cacheable document may be facilitated in certain example embodiments through serialization of the dictionaries and parser table used by the document to the shared cache (parsed data store). Because the partition table includes no memory references (e.g., addresses) in certain example embodiments, the serialization can be efficient and direct, thereby improving the practical utility of a shared document (for example, in a cloud computing environment). Multiple concurrent readers may be fully supported in this configuration, even when the processes share no physical program memory.

Supporting multiple concurrent readers and one updater is possible, e.g., if the caching hierarchy provides update notifications to the readers when the cache contents change. A parsed data store embodiment using Terracotta's BIGMEMORY®, for example, can provide this notification. Change notification may result in the refresh of partitions that have been updated by another process.

Example Techniques for Supporting Atomic Updates

Atomic XML updates are frequently achieved through the use of XML databases (especially when large XML information sets are being manipulated) or application frameworks that manage undo operations. The inconvenience and complexity of introducing database operations and semantics into an otherwise DOM-centric application can be complex and inconvenient. Indeed, one trend in information processing is to avoid the database in favor of other "Big Data" approaches.

Certain example embodiments enable atomic updates to be performed on very large XML information sets using the above-described example approaches as a starting point, e.g., rather than resorting to the use of XML databases or the like. Formalized atomic updates for XML advantageously enables more rapid, reliable, and robust DOM applications that have, for example, the ability to selectively commit and/or rollback complex changes to large information sets.

Certain example embodiments also make it possible to optionally present a committed read-only copy of the document at a point in time, e.g., even as the document continues to be updated. This capability may be advantageous in a variety of scenarios including, for example, in connection with applications that require a snapshot at an instant in time of a continually changing document. Support for shadowed documents optionally may be provided as well, as atomic document updates may be made possible in some implementations with or without such support.

It will be appreciated from the description that follows that certain example embodiments may leverage the same partition encoding format as that described above, may leverage the same user API as that described above, and/or may utilize the same parsed data store as that described above. Consequently, certain example embodiments may be employed in the same environment and share common storage (for example, Terracotta BigMemory storage). Such a deployment advantageously may allow users to select the binding strategy that is desired and potentially optimal for their usage such as, for example, traditional DOM update and/or atomic DOM update (e.g., with only a minor loss of performance).

Brief Introduction to Atomic Updating

Referring more particularly to the example issues noted in the immediately preceding section, a DOM application can accomplish atomic updates by tediously tracking every change and then reversing the changes when needed. For example, when updating a large and complex XML document, it might take a considerable amount of advance traversal of the document, e.g., to determine in advance if a successful update is possible. For example, one might not want to start an update or even a portion of an update if it is not known ahead of time and for certain that the update or update portion will succeed. The traversal may in some instances involve the construction of various auxiliary data structures, execution of algorithms, etc., e.g., to verify the input before processing. Additionally, DOM updates may sometimes result in a variety of unanticipated changes to a document. For example, document normalization, as well as namespace fix-up, can result in changes throughout a document that are not easily discernible by the program or application. Designing a program that can do that kind of traversal in advance, as well as track changes in a way that enables an "undo," can be very difficult. That approach can be quite error-prone and expensive, e.g., with respect to the cost of implementation.

Atomic updates as provided through certain example embodiments can, however, sometimes allow an application or program to directly update the tree in a more straightforward and natural way. For instance, if more than one variation of a document is possible, an unexpected value in part of the document requires an "undo," etc., a single API call can restore the document to the last desirable (e.g., committed) state. This can greatly simply application construction and lead to more reliable implementations. Furthermore, certain example embodiments may accomplish this with arbitrary DOM updates.

Similar to the discussion above, a DOM application can accomplish document shadowing only by tediously tracking every document change with respect to every viewer of the document, e.g., to present a consistent view of the document at an instant in time for a particular viewer. Designing a program that can do that kind of change tracking in a way that enables multiple consistent views can be very difficult. An approach for accomplishing this similarly is likely to be quite error prone and expensive, e.g., with respect to the cost of implementation.

However, in certain example embodiments, document shadowing may allow any number of concurrent viewers of the shared (and perhaps constantly changing) document. When a reader opens a shared document, the application may in essence see a consistent view of the document at the time it was opened. One writer may continue to update and commit changes. A new viewer may always access the most recently committed version of the document. Example scenarios when this may come into play include complex shared configuration information, auditing information, large pools of shared information, etc. Although constantly reparsing a large XML document shared by many users ordinarily might be very inefficient, certain example embodiments allow initial parsing as well as updates to be made accessible to any number of readers without the overhead of each reader parsing the document. And this may in some implementations be accomplished with arbitrary DOM updates, similar to as described above.

Overview of Example Atomic Updating Techniques

As a starting point, the example techniques disclosed herein for processing atomic updates preserve the capabilities described above. For example, in certain example embodiments, it is possible to break an XML information set into segments and to encode the information into partitions in a way that reduces and sometimes even eliminates the need to instantiate all of the nodes in a DOM tree. In fact, in certain example embodiments, the only nodes that are ever instantiated are those that are referenced, and they may remain instantiated only as long as they remain referenced.

Furthermore, certain example embodiments may take advantage of the encoded nature of the information set as described above. When an atomic update is started, the partition table list of cacheable partitions (e.g., and not their content) is copied and pushed onto a stack. The copied partition table list becomes the current partition table list and includes the partition identifiers of the working contents of the document. Before the content of a particular unchanged partition is updated, it is copied and the copy becomes the current version of the partition. This copying is efficient because cacheable partitions can be encoded, e.g., using a few arrays of primitive types that can be copied quickly and efficiently. Multiple changes may be performed on any number of partitions. When the updates are committed, the updated partitions become the new current version of those partitions. The original partitions that we copied may now be released from storage. If the update is cancelled, the updated partitions are discarded and the partition table list is simply popped from the stack and the previous list becomes the current list.

Simple atomicity and shadowing for transient XML documents using the DOM API may be implemented in certain example embodiments, e.g., as a way to avoid the complexity and cost of introducing a full XML database into an application.

Conventional transacted database system typically provide so-called "ACID" properties of "atomicity," "consistency," "isolation," and "durability". Atomicity refers to the ability of a database system to guarantee that either all of the steps/operations of a transaction are performed, or none of them are performed. The consistency property ensures that the database remains in a consistent state before the start of a transaction and after the transaction is over (whether successful or not). Isolation refers to the property that other steps/operations cannot access or see the data in an intermediate state during a given transaction. Lastly, durability refers to the property that once a user who initiated a transaction has been notified of success of the transaction, the transaction will persist and, thus, will not be undone.

In contrast with these properties of conventional databases, certain example embodiments process transient XML documents as produced in accordance with the detailed description above and do not necessarily address durability. Operations are atomic, and consistency and isolation are achieved for one writer and multiple readers. This subset of traits has, however, been observed to be adequate for many (if not most) applications. It is in this broad range of scenarios that certain example embodiments may make it possible to adapt existing DOM applications, as well as create new DOM applications, without introducing the complexity and cost of a conventional database.

By limiting processing to transient XML documents stored in partitions in accordance with certain non-durable example embodiments, database storage management (which generally is one of the more complex and tedious issues) can be avoided. It will be appreciated, however, that certain example implementations may permit a user to serialize the partitions of a document to some external storage, and then deserialize them from the external storage back into document partitions. By doing so, an application may in some cases achieve a simple form of durability adequate for many applications.

Another feature provided by some conventional database systems involves schema-based views. Such schemas can introduce much formality into the data but can further complicate application development. Schemas can, for example, make it particularly difficult to manipulate documents that are constantly changing. By avoiding formal schemas, the document shadowing provided in certain example embodiments (providing consistency and isolation) can be considered very light-weight and can adapt very well to dynamically changing shared documents, and/or the like.

Example Implementation for Atomic Updating Techniques

Certain example embodiments use the same components as described above, e.g., in connection with FIGS. 1, 5, and 6. One way that these structures may be changed to enable atomicity, however, may in certain example embodiments involve the way in which the cacheable partition entries in the partition table are managed. The API also may be extended in certain example embodiments to enable atomic updates. Further information concerning the example programming interface, partition table management, etc., are set forth in detail below.

Example Programming Interface

The atomic update facility is engaged through the cached DOM document that is created when an XML stream is parsed. The facility is accessed using a programming API. For instance, a Java implementation may include new methods on the cached document object such as, for example:

Start Atomic Update—a method, for example, startUpdate( ), may be used to indicate the start of an atomic unit of work. This invocation may be followed by any number of arbitrary DOM calls performing any allowed DOM operation.

Complete Atomic Update—a method, for example, completeUpdate( ), may be used to indicate that all updates are complete and should be committed as a unit. This does not necessarily imply that changes have been committed to a persistent store, but rather that the partition table includes a consistent document.

Cancel Atomic Update—a method, for example, cancelUpdate( ), may be used to indicate that all changes applied since the previous startUpdate( ) should be discarded and that the document should revert to the exact state prior to the startUpdate( ).

The API of certain example embodiments may permit any number of sequential invocations of startUpdate( ), eventually followed by a completeUpdate( ) or cancelUpdate( ). Each may in essence represent a unit of work that was completed or discarded for the document in a sequential manner.

The API of certain example embodiments additionally or alternatively may permit any number of nested invocations of startUpdate( ). Each invocation may create a new commit level that may be cancelled or completed without affecting the updates in progress that were started at an earlier level.

It is also possible in certain example embodiments for a document owner to expose a copy of the document, e.g., at a given level of commitment. This may be achieved by providing to the API the following example functions:

Create Shadowed Document—a method, for example, createShadowedDocument( ), may return a cached DOM document node that preserves the state of the currently committed document. A document has a current commit state if there at least one start atomic update operation has been invoked for which there has not been a corresponding complete atomic update or cancel atomic update operation. The returned document may reflect the last available consistent state of the document.

Revoke Shadowed Document—a method, for example, revokeShadowedDocument( ), may cause the partition table entries for a shadowed document to be purged. When an attempt is made to read or write a partition that is owned by a shadowed document after it has been revoked, an error condition may be raised. This may be used most typically when a shadowed document reference is passed to another thread and the thread that "owns" the base document wishes to force the thread to relinquish access to the shadowed partitions. This may be beneficial when, for example, the parent thread is terminating and wants to ensure that backing resources have been released.

Creating a shadowed document does not necessarily imply the immediate creation of copied cacheable partitions. Instead, this event may in certain example embodiments effectively declare an interest in the cacheable partition(s)

that comprise(s) the shadowed document at the time when the document is created. If the owner subsequently changes the backing partitions, for example, those changes may be performed on a new copy. When the copy is committed, the changes may be available only to new shadowed documents created subsequent to the commit. Existing shadowed documents may continue to retain their original content indefinitely, e.g., until all references to them are released. When all references to shadowed partitions are cleared, the partition may be removed from the parsed document store.

Example Partition Table Management

As described above, the partition table may include a list of partition identifiers that identify cacheable partitions that reside in the document store. It will be appreciated that the list may be augmented with additional information, e.g., to facilitate the atomic updating techniques of certain example embodiments. Each entry may, for example, be provided with a commit level. The commit level may be an integer or other value that reflects the nesting level of started atomic updates. Initially, an entry will start with a "zero" commit level may be zero, and all entries in the list therefore initially may have a commit level of zero. Each partition also may have a shadowed document count that reflects the number of shadowed documents that have an interest in this partition. As above, this shadowed document count may at least initially be zero for each partition.

Figure 7:
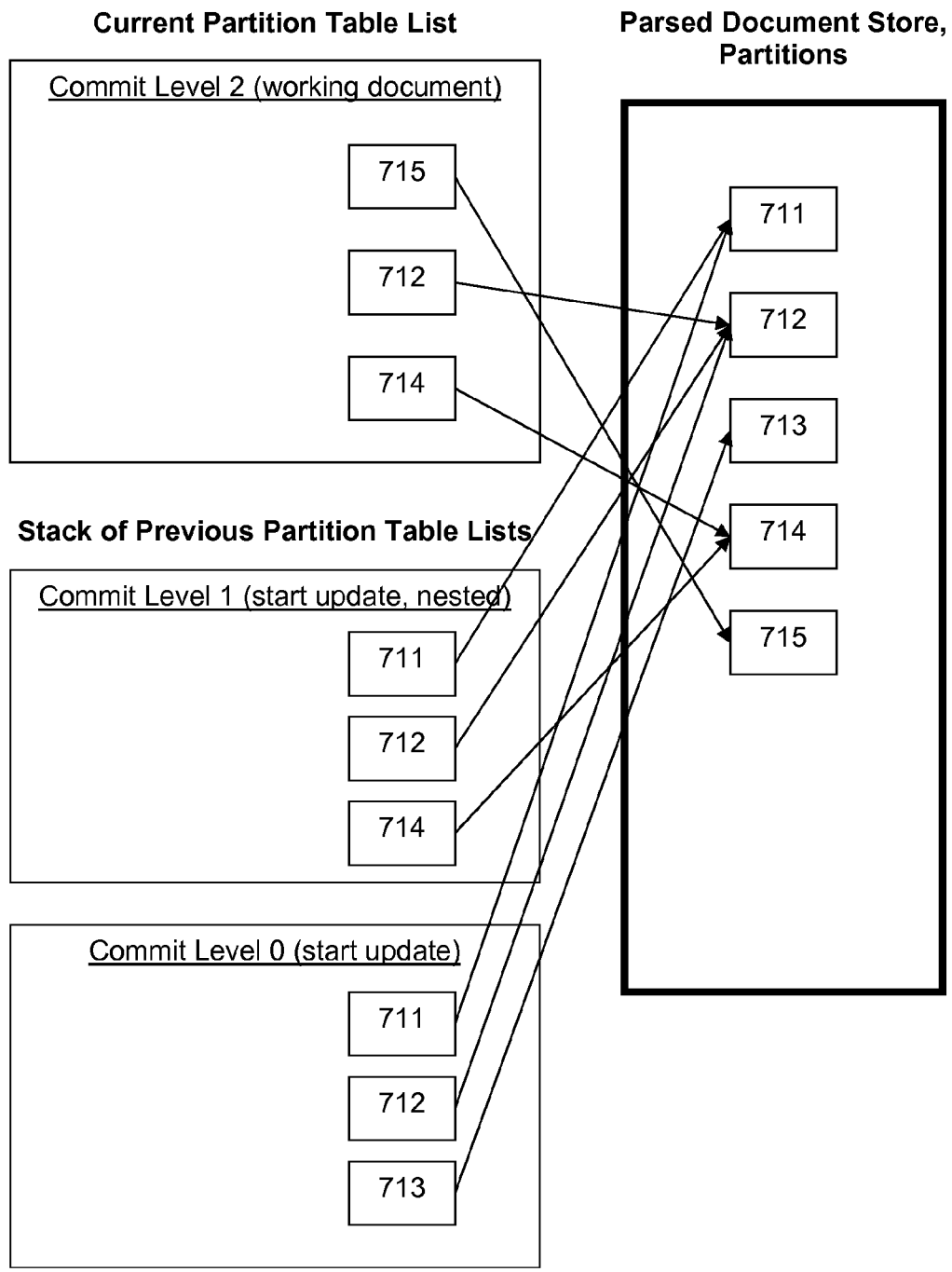
FIG. 7 shows a partition table, current list and stack, and partitions in use, in providing atomic updates for an example scenario, in accordance with certain example embodiments.
Figure 8:
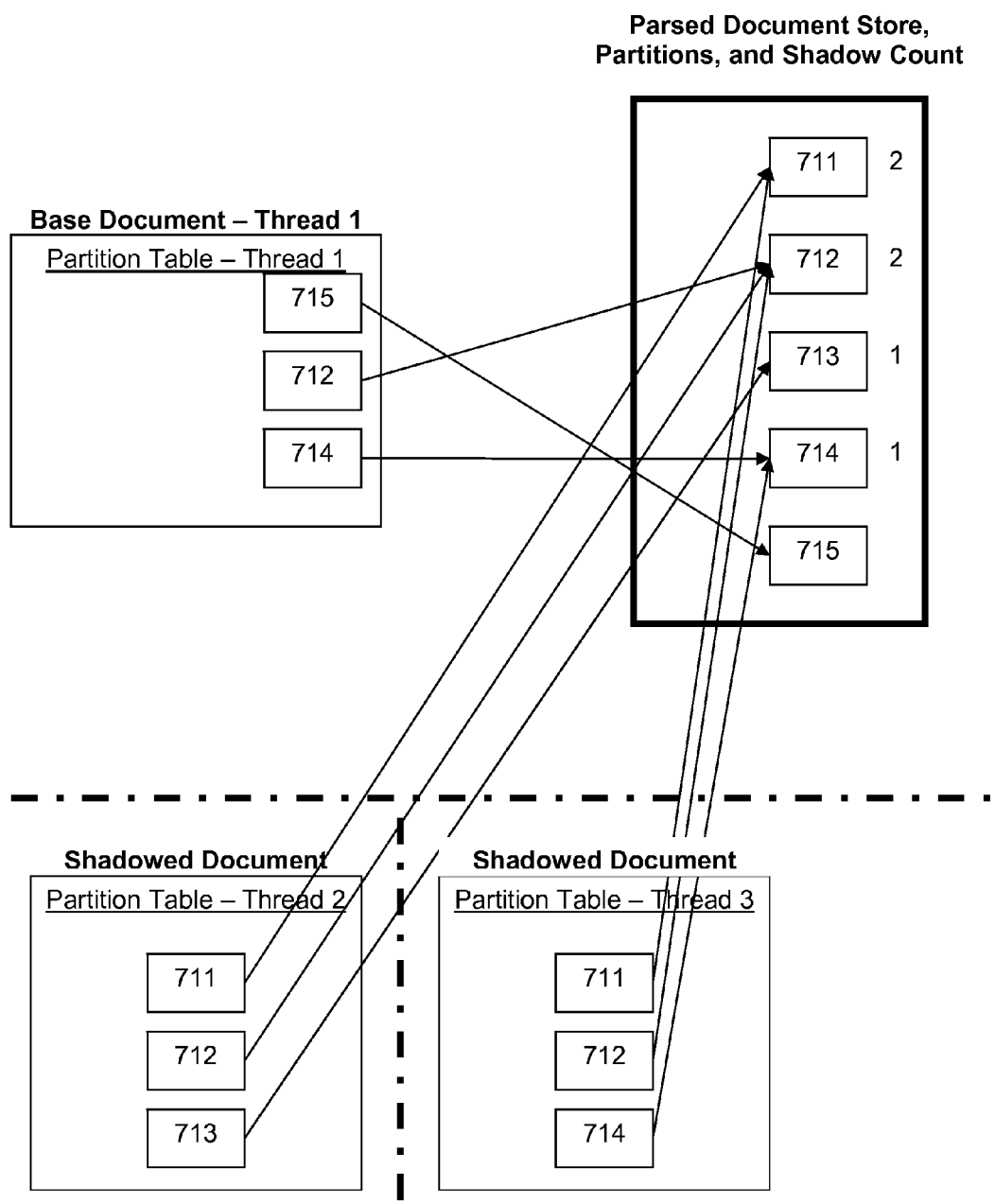
FIG. 8 shows how showed documents may be implemented in providing atomic updates for an example scenario, in accordance with certain example embodiments.

An illustration of the partition table management techniques of certain example embodiments will now be provided in connection with an example scenario illustrated in FIGS. 7-8. In this regard, FIG. 7 shows a partition table, current list and stack, and partitions in use, in providing atomic updates for an example scenario, in accordance with certain example embodiments, and FIG. 8 shows how showed documents may be implemented in providing atomic updates for an example scenario, in accordance with certain example embodiments.

Prior to the initiations of any top level update, or after its subsequent completion or cancellation, the partition table behaves exactly like the behavior described above. Referring more particularly to the FIG. 7 example scenario, the bottom entry on the stack at commit level 0 corresponds to the state of the document before an atomic update is started. The document is encoded into partitions 711, 712, and 713.

When an atomic update is started, a copy is made of the partition table list, and the current partition table list is pushed onto a stack. In certain example embodiments, only a list of partition identifiers, and commit levels is being copied (although it will be appreciated that other example embodiments may copy additional data). The contents of the partitions themselves (which could be quite large) are not copied, however. The current commit level is incremented.

When a partition's content is changed and the partition's commit level does not match the current commit level, the partition content is copied to create a new partition and the original partition reference is replaced with the new partition. In addition, the nesting level is changed to reflect the current commit level. Referring once again to the FIG. 7 example scenario, the stack entry for nesting level 1 shows that the first partition for partition 713 has been replaced by new partition 714.

If a "complete update" action is performed, the partition table list is popped from the stack to become the candidate partition table list. Entries in the current partition table list with a commit level that matches the current commit level are copied into the candidate partition table list. Any entries in the candidate list that have a shadowed document count of zero are no longer needed and can be freed, e.g., as there are no other possible atomic updates to consider. The candidate list becomes the current partition table list. The current commit level is decremented.

It will be appreciated that the logic described can be carried out to any arbitrary nesting level of started atomic updates. Referring to FIG. 7, for instance, a nested update is commenced, and a change causes the partition 711 to be replaced by 715.

A program may optionally create a shadowed document at any commit level greater than a predetermined threshold which logically could be zero. For instance, when a program performs a create shadowed document operation, a copy of the partition table list may be made (e.g., at one level below the current commit level) at that instant and it may used to create a new read-only cached document. In addition, the shadowed document count for each partition in the shadowed document is incremented.

If a shadowed copy is created for a partition that has already been modified, any attempt to further modify the shadowed partition may cause the shadowed partition to be replaced by a copy of the shadowed partition in the partition table. This helps ensure that previously created shadowed documents retain their integrity even if a shadowed partition is modified. That is, in certain example embodiments, if a shadowed document's partition table includes a reference to a partition that has already been modified by the writer and is therefore already being shadowed, any attempt by the writer to further modify the shadowed partition will result in the allocation of a new shadowed copy of the partition in the writer's partition table. The reader's partition table includes the initial shadowed copy of the partition. This ensures that the reader's shadowed document retains its integrity even if a shadowed partition is further modified by the writer.

When a shadowed document is released, the shadowed document count for each of its partitions is reduced by one. When the shadow count becomes zero (and thus is not in the partition table list stack), the partition may be freed.

Referring to the FIG. 8 example, thread 2 has a shadow copy of the document created after the initial start update of FIG. 7. Thread 3 has a shadow copy of the document created after the nested start update of FIG. 7. There are two updates to partitions 711 and 712 in the stack shown in FIG. 7; thus, the corresponding shadow counts for these partitions are shown as being two in FIG. 8. Similarly, there is only one update to partitions 713 and 714 in the stack shown in FIG. 7; thus, the corresponding shadow counts for these partitions are shown as being one in FIG. 8. The current partition table list at commit level 2 is the working document and includes an update to partition 715. It also will be appreciated that partition 715 does not appear in any of the shadowed document partition tables for threads 2 or 3. Because only the current state includes the update to partition 715, the shadow count in FIG. 8 is 0.

Example Tuning Techniques

The partition size as described above may be used to tune the operating performance of certain example embodiments where atomic updates are processed. If a small number of updates are expected, it may be desirable to employ a large partition size, which tends to maximize system throughput. However, if there are a large number of updates and memory is constrained, it may be desirable to employ a small partition size. This may help reduce the serialization and deserialization overhead incurred when a partition is moved between main memory (implemented in, for example, Java heap memory) and the document store (implemented in, for example, BigMemory).

In view of the foregoing, it will be appreciated that certain example embodiments relate to a system for processing XML documents comprising processing resources including at least one processor, a memory, and a non-transitory computer readable storage medium. The processing resources are configured to: parse an XML document into one or more constituent nodes, with the XML document including a plurality of objects representable in accordance with an object model, the XML document being parsed without also instantiating the objects therein; store the parsed constituent nodes and associated metadata in one or more partitions, with each said partition having an associated commit level that initially is set to 0; store, for each said partition, an identifier thereof in a partition table list, the identifier(s) in the partition table list collectively identifying the working contents of the XML document, with the partition table list initially being designated as a current partition table list and initially being designated as having a current commit level of 0; and manage atomic updates to the XML document in connection with a stack configured to hold one or more previous partition table lists.

According to certain example embodiments, in response to a request for an atomic update the XML document, the processing resources may be further configured to: push onto the stack a copy of the current partition table list; increment the current commit level; and when a given partition's contents is changed as a result of the atomic update and the commit level associated with the given partition does not match the current commit level, copy the given partition's contents to create a new partition with the changed contents and replace the identifier for the given partition in the current partition table list with an identifier for the new partition. In this vein, the processing resources may, in response to an atomic update being completed, be further configured to: pop from the stack the uppermost partition table list, with the popped partition table list being treated as a candidate partition table list; copy identifiers for any partitions in the current partition table list that have associated commit levels that match the current commit level into the candidate partition table list; replace the current partition table list with the candidate list; and decrement the current commit level. This procedure may be implemented for plural requests for atomic updates the XML document, etc., in certain example embodiments.

According to certain example embodiments, the copy of the current partition table list may be pushed onto the stack without copying the contents of any partitions identified in the current partition table list. For instance, according to certain example embodiments, responses to requests for atomic updates to the XML document do not involve copying the contents of any partitions, unless a determination is made that a given partition's contents is changed as a result of a respective atomic update and the commit level associated with that given partition does not match the current commit level.

According to certain example embodiments, the processing resources may be further configured to create a shadowed document and associated with each partition a shadowed document count. Optionally, the creation of a shadowed document may include the copying of the current partition table list at one level below the current commit level.

In a similar vein, in certain example embodiments, a method of processing large documents is provided. A large document (e.g., an XML document) is parsed, in connection with at least one processor, into one or more constituent nodes. The document includes a plurality of objects representable in accordance with an object model, and the document is parsed without also instantiating the objects therein. The parsed constituent nodes are stored in one or more cacheable partitions, with the cacheable partitions being located in a memory and/or a non-transitory backing store, and with each said cacheable partition having an associated commit level that initially is set to 0. For each said cacheable partition, an identifier thereof is stored in a partition table list, with the identifier(s) in the partition table list collectively identifying the working contents of the document, and with the partition table list initially being designated as a current partition table list and initially being designated as having a current commit level of 0. A request from a user program for an object from the document is handled, e.g., by identifying the partition(s) in which nodes corresponding to the requested object is/are located and instantiating only said requested objects from the identified partition(s) in accordance with the object model. Atomic updates to the document are managed in connection with a stack configured to hold one or more previous partition table lists. Certain example embodiments relate to a non-transitory computer readable storage medium tangibly storing instructions that, when executed by a processor, perform this and/or other related methods.

Although certain example embodiments have been described as being implemented with a stack, it will be appreciated that other data structures may be used instead of, or in addition to, a stack. For instance, as is known, a queue may be used to provide the same or similar functionality as a stack. It also will be appreciated that certain example embodiments may in effect privilege the updates of one or more users or users classes over other users, e.g., by prioritizing associated atomic updates in the stack or other data structure accordingly.

A description of certain terms is provided below for aiding in the understanding of how certain example embodiments may operate. However, it is to be understood that the following descriptions are provided by way of example for explanatory purposes and should not be construed as being limiting on the claims, unless expressly noted.

| Term | Example Description |
| --- | --- |
| Allocation Array | A potentially linear list maintained in the partition table. For each cacheable partition in the partition table, a corresponding entry in the allocation array may specify the allocation identifier of the last encoded node in the partition. This makes it possible, given a node's allocation identifier, to determine the cacheable partition in which a node resides, e.g., by performing a simple linear, binary, or other search of the allocation array. Given a cacheable partition, the exact location of an encoded node in the partition can be calculated by using the node's allocation identifier as a relative offset into the partition's locator array. |

-continued

| Term | Example Description |
|---|---|
| Allocation Identifier | When a parsed XML fragment is encoded into a cacheable partition, the corresponding encoded node may be assigned an allocation identifier. The allocation identifier may preserve the order in which nodes are created. One simple order-preserving allocation identifier that may be used in connection with certain example embodiments is a simple integer counter that is incremented every time a new node is encoded into a cacheable partition. The allocation identifier may be unique within a cacheable document and may be unique for the life of the cached document. Each DOM entity (e.g., element, text, etc.) may be assigned an allocation identifier that allows it to be located within the cached document. As alluded to above, it may be an integer value and assigned in ascending order as XML entities are encountered during parsing. |
| Terracotta Big Memory | A feature that allows large (and possibly serializable) objects to be stored in an off-heap memory cache. The use of Terracotta's Big Memory feature may be used in connection with the parsed data store of certain example embodiments. |
| Cacheable Document | A composite object that includes a DOM document node implementation along with a partition table and associated cacheable partitions. Any DOM object may be navigated to and retrieved from the cached document. A cacheable document may be created by invoking the XML partitioning engine, passing it an XML document stream and/or a parsed data store implementation. |
| Cacheable Partition | A composite object that includes structured information about a segment of an XML document that has been pre-parsed. In certain example embodiments, a cacheable partition may include a character array, a properties array, and a locator array. A cacheable partition may be present in an on-heap local partition pool, and/or it may have been serialized and archived to the parsed data store. |
| Character Array | A component part of a cacheable partition, in certain example embodiments, that is available for storing character data. The values of XML text, CData entities, and XML attribute values may be saved in the Character Array. |
| Commit Level | An integer or other value reflecting the number of nested "start atomic updates" that have been requested. |
| Dictionary | A potentially memory-resident storage mechanism that ensures only a single copy of a value is saved. Multiple encoded nodes can refer to the same dictionary entry, thereby reducing memory usage. Element names, attribute names, namespace URIs, and/or the like, may be stored in dictionaries in certain example implementations, thereby potentially reducing the size of encoded nodes. Attribute values and text values may optionally be stored in dictionaries. |
| Direct Parsed Data Access | A technique in which the use of the local partition pool is reduced in favor of direct access to the caching store. This approach may be desirable when, for example, access to the caching store is possible without serialization and deserialization overhead. |
| Document Node | A node created by the parsing process. DOM parsers may produce a document node from which other members of a DOM tree are retrieved through navigation. The document node created by the XML partitioning engine may also include a names dictionary, a namespace dictionary, and a reference to a partition table. |
| DOM Instantiator | Hardware and/or program code that takes an allocation identifier reference to an encoded DOM node in a cacheable partition and instantiates (creates) a fully functioning DOM node. |
| Encoded Node Entry | Information in a cacheable partition that allows the corresponding DOM node to be constructed on demand. Every encoded node entry in a cacheable partition may be assigned a unique allocation identifier that is used for subsequent retrieval of the encoded node |
| Familial Relationship | Each node in a DOM tree may have a parent node, a previous sibling, and a next sibling. Additionally, an element node may have a first child and a last child. When nodes are encoded in the properties array, the references to these familial nodes may be recorded as allocation identifiers rather than physical memory references. |
| Inter-Node Reference | A reference using a node's allocation identifier. Encoded DOM nodes may represent familial references (e.g., parent, sibling, and/or child references) using allocation identifiers. In order to construct the DOM node given its allocation identifier, an index maintained by the partition table may determine which cacheable partition includes the encode node. This may be achieved without fetching any archived buffers in certain example embodiments. Having identified the cacheable partition containing the node, the allocation identifier may be used as an offset into the locator array to determine the starting position of the encoded node's definition in the properties array. The values in the properties may be indices into the character array, or into the names or namespace tables, and may allow the full construction of the requested node. |
| Local Partition Pool | A pool of cacheable partitions that has not been archived to the parsed data store and, thus, may be immediately usable. It is possible and potentially likely that many XML documents may not require any serialization and can reside entirely in the local partition pool. |

-continued

| Term | Example Description |
|---|---|
| Local Partition Pool Throttling | A technique that maintains total memory allocation for the local partition pool below some threshold. If the threshold is exceeded, additional document parsing may be delayed until the allocation drops below the threshold. |
| Locator Array | A component part of a cacheable partition, in certain example embodiments. It may be a linear list, e.g., of integers, that identifies the starting position of an encoded node in the properties array and thus may represent a list of the encoded nodes in the order that they were created. |
| Outstanding Atomic Update | An atomic update that has been started but not yet completed or cancelled. The existence of an Outstanding Atomic Update may imply that there is a preserved state for the document prior to the start of the atomic update. This may be true regardless of the nesting level of the updates. The available state is the state just before the most recent "start atomic update." |
| Parsed Data Store | A non-program-memory storage mechanism (e.g., off-heap memory in Java-based environments) where cacheable partitions can be archived for subsequent retrieval and use. One possible embodiment of such off-heap storage is a Terracotta Big Memory instance, which may be multi-tiered and include non-heap local memory (Terracotta Big Memory), as well as traditional disk-based (and potentially shared) caches. |
| Partition Table | A collection of cacheable partitions that includes the metadata from the pre-parsing of an XML document stream. It also may include an allocation array that allows a node's allocation identifier to be resolved to a specific cacheable partition. It may be created by the XML partitioning engine. |
| Properties Array | A component part of a Cacheable Partition that is an array of integer or other values, in certain example embodiments. The information that defines an encoded DOM node may be represented as a series of integer or other values somewhere within the properties array, potentially adjacent to other DOM node encodings. The integer values may encode the node type, references to familial nodes (e.g., parents, siblings, and/or children) using allocation identifiers, and offsets into the character array for attribute and text values. |
| Shadowed Document | A read-only cacheable document that preserves the state of a cacheable document, e.g., at committed level. No shadowed document is available unless there is an outstanding atomic update. |
| XML Document Stream | A stream of characters that comprises a well-formed XML document. |
| XML Partitioning Engine | Hardware and/or a software program that pre-parses an XML document steam into fragments and creates a cacheable document including, for example, a partition table and one or more cacheable partitions. The pre-parsed fragments may be stored in cacheable partitions and/or in dictionaries. |

Although certain example embodiments have been described in connection with XML documents and the Document Object Model, it will be appreciated that the example techniques described herein may be used in connection with other document and/or model types.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:
1. A method of processing documents, comprising:
parsing, in connection with at least one processor, a document into a plurality constituent nodes, the document including a plurality of Document Object Model (DOM) objects representable in accordance with an object model;
storing the parsed constituent nodes in a plurality of cacheable partitions, the cacheable partitions being located in a memory or a non-transitory backing store, wherein a first node of the parsed constituent nodes is stored in a first partition of the plurality of partitions and a second node of the parsed constituent nodes is stored in a second partition of the plurality of partitions, and each said cacheable partition having an associated commit level that initially is set to 0;
storing, for each said cacheable partition, an identifier thereof in a partition table list, the identifier(s) in the partition table list collectively identifying the working contents of the document, the partition table list initially being designated as a current partition table list and initially being designated as having a current commit level of 0;
handling a request from a user program for an object from the document by identifying the one or more partitions in which nodes corresponding to the requested object are located and instantiating only said requested objects from the identified partition(s) in accordance with the object model;

in response to a request for an atomic update to the document:
  pushing onto a stack, configured to hold one or more previous partition table lists, a copy of the current partition table list;
  incrementing the current commit level;
  determining whether a given partition's contents are changed as a result of the atomic update and whether the commit level associated with the given partition does not match the current commit level; and
  when a given partition's contents are changed as a result of the atomic update and the commit level associated with the given partition does not match the current commit level, copying the given partition's contents to create a new partition with the changed contents and replace the identifier for the given partition in the current partition table list with an identifier for the new partition; and
in response to an atomic update being completed:
  popping from the stack the uppermost partition table list, the popped partition table list being a candidate partition table list;
  determining partitions in the current partition table list that have associated commit levels that match the current commit level into the candidate partition table list;
  copying identifiers for any partitions in the current partition table list that have associated commit levels that match the current commit level into the candidate partition table list;
  replacing the current partition table list with the candidate list; and
  decrementing the current commit level.

2. The method of claim 1, further comprising, in response to all atomic updates being completed, repeating, until a determination is made that the stack is empty:
  popping from the stack the uppermost partition table list;
  copying identifiers for any partitions in the current partition table list that have associated commit levels that match the current commit level into the candidate partition table list;
  replacing the current partition table list with the candidate list; and
  decrementing the current commit level.

3. The method of claim 1, further comprising pushing the copy of the current partition table list onto the stack without copying the contents of any partitions identified in the current partition table list.

4. The method of claim 1, further comprising:
  selectively creating a shadowed document; and
  associating with each partition a shadowed document count.

5. The method of claim 4, wherein the creation of a shadowed document includes the copying of the current partition table list at one level below the current commit level.

6. The method of claim 1, wherein the object model is the document object model.

7. The method of claim 1, wherein the document is an XML document.

8. A non-transitory computer readable storage medium tangibly storing instructions that, when executed by a processor, perform the method of claim 1.

9. A system for processing XML documents, comprising:
  processing resources including at least one processor, a memory, and a non-transitory computer readable storage medium;
  wherein the processing resources are configured to:
    parse an XML document into a plurality of constituent nodes, the XML document including a plurality of Document Object Model (DOM) objects representable in accordance with an object model;
    store the parsed constituent nodes and associated metadata in a plurality of partitions, wherein a first node of the parsed constituent nodes and associated metadata is stored in a first partition of the plurality of partitions and a second node of the parsed constituent nodes and associated metadata is stored in a second partition of the plurality of partitions, and each said partition having an associated commit level that initially is set to 0;
    store, for each said partition, an identifier thereof in a partition table list, the identifier(s) in the partition table list collectively identifying the working contents of the XML document, the partition table list initially being designated as a current partition table list and initially being designated as having a current commit level of 0;
    in response to a request for an atomic update to the XML document:
      push onto a stack, configured to hold one or more previous partition table lists, a copy of the current partition table list;
      increment the current commit level;
      determine whether a given partition's contents are changed as a result of the atomic update and whether the commit level associated with the given partition does not match the current commit level; and
      when a given partition's contents are changed as a result of the atomic update and the commit level associated with the given partition does not match the current commit level, copy the given partition's contents to create a new partition with the changed contents and replace the identifier for the given partition in the current partition table list with an identifier for the new partition; and
    in response to an atomic update being completed:
      pop from the stack the uppermost partition table list, the popped partition table list being a candidate partition table list;
      determine partitions in the current partition table list that have associated commit levels that match the current commit level into the candidate partition table list;
      copy identifiers for any partitions in the current partition table list that have associated commit levels that match the current commit level into the candidate partition table list;
      replace the current partition table list with the candidate list; and
      decrement the current commit level.

10. The system of claim 9, wherein each of the partitions is structured to include only logical references among and between the parsed constituent nodes.

11. The system of claim 9, wherein parsing the XML document into the plurality of constituent nodes includes allocating an attribute value dictionary that stores unique occurrences of attribute values included in the XML document, or a text value dictionary that stores unique occurrences of text values included in the XML document.

12. The system of claim 11, wherein the processing resources, in response to the atomic updates being completed, are further configured to repeat, until a determination is made that the stack is empty:
   popping from the stack the uppermost partition table list;
   copying identifiers for any partitions in the current partition table list that have associated commit levels that match the current commit level into the candidate partition table list;
   replacing the current partition table list with the candidate list; and
   decrementing the current commit level.

13. The system of claim 9, wherein the copy of the current partition table list is pushed onto the stack without copying the contents of any partitions identified in the current partition table list.

14. The system of claim 9, wherein responses to requests for atomic updates to the XML document do not involve copying the contents of any partitions, unless a determination is made that a given partition's contents are changed as a result of a respective atomic update and the commit level associated with that given partition does not match the current commit level.

15. The system of claim 9, wherein the processing resources are further configured to create a shadowed document and associated with each partition a shadowed document count.

16. The system of claim 15, wherein the creation of a shadowed document includes the copying of the current partition table list at one level below the current commit level.

17. The system of claim 9, wherein the processing resources are further configured to: receive requests for DOM objects from the XML document from a user program, and in response to requests for DOM objects from the XML document from the user program, instantiate only said requested DOM objects from their associated partition(s) in accordance with the object model.

18. The system of claim 17, wherein DOM objects instantiated from the partitions, when resident in the memory, are free from references to other DOM objects in their own respective partitions and any other partitions.

19. The system of claim 17, wherein the object model is the document object model.

20. The system of claim 9, wherein each of the partitions is cacheable and includes a plurality of encoded nodes.

21. The system of claim 9, wherein each of the partitions is cacheable and is encoded.

22. The system of claim 9, wherein the processing resources are configured to move the partitions through a caching storage hierarchy of the processing resources without adjusting or encoding memory references therein.

* * * * *